United States Patent
Holler et al.

(10) Patent No.: US 8,037,872 B2
(45) Date of Patent: Oct. 18, 2011

(54) ENGINE SYSTEM HAVING COOLED AND HEATED INLET AIR

(75) Inventors: Dennis P. Holler, West Lafayette, IN (US); Travis S. Johnson, West Lafayette, IN (US); Matthew R. Hulen, West Lafayette, IN (US); Randall J. Anliker, Francesville, IN (US); Michael W. Edwards, West Lafayette, IN (US); Larry L. Spurgeon, Rensselaer, IN (US); Victor L. Sheldon, Jr., Spring, TX (US)

(73) Assignee: Caterpillar Inc., Peoria, IL (US)

( * ) Notice: Subject to any disclaimer, the term of this patent is extended or adjusted under 35 U.S.C. 154(b) by 854 days.

(21) Appl. No.: 12/068,488

(22) Filed: Feb. 7, 2008

(65) Prior Publication Data

US 2008/0295811 A1 Dec. 4, 2008

Related U.S. Application Data

(60) Provisional application No. 60/924,790, filed on May 31, 2007.

(51) Int. Cl.
*F02M 31/10* (2006.01)
(52) U.S. Cl. .......................... 123/542; 123/556
(58) Field of Classification Search .................. 123/563, 123/542, 556, 179.21
See application file for complete search history.

(56) References Cited

U.S. PATENT DOCUMENTS

| | | | |
|---|---|---|---|
| 3,397,684 A * | 8/1968 | Scherenberg | 123/179.21 |
| 3,441,011 A * | 4/1969 | Karl | 123/542 |
| 4,201,168 A | 5/1980 | Ohama | |
| 4,548,183 A | 10/1985 | Hayashi | |
| 5,094,198 A | 3/1992 | Trotta et al. | |
| 5,347,966 A | 9/1994 | Mahon et al. | |
| 5,385,132 A | 1/1995 | Lehman | |
| 5,482,013 A | 1/1996 | Andrews et al. | |
| 5,655,506 A | 8/1997 | Hollis | |
| 6,145,497 A * | 11/2000 | Kervagoret et al. | 123/563 |
| 6,243,642 B1 | 6/2001 | Thomas | |
| 6,445,997 B2 | 9/2002 | Thomas | |
| 6,536,419 B2 | 3/2003 | Roley | |
| 7,100,584 B1 * | 9/2006 | Bruestle et al. | 123/563 |
| 7,717,097 B2 * | 5/2010 | Guerrero | 123/542 |

FOREIGN PATENT DOCUMENTS

| | | |
|---|---|---|
| JP | 58148226 | 9/1983 |
| JP | 2002021653 | 1/2002 |

* cited by examiner

*Primary Examiner* — M. McMahon
(74) *Attorney, Agent, or Firm* — Finnegan, Henderson, Farabow, Garrett & Dunner LLP

(57) ABSTRACT

A thermal management system for an engine is disclosed. The thermal management system may have a first heat exchanger situated to cool air directed into the engine, a pump configured to pressurize a fluid directed through the engine, and a second heat exchanger situated to transfer heat absorbed by the fluid to air directed into the engine. The thermal management system may also have a heater configured to provide supplemental heat to air directed into the engine.

14 Claims, 2 Drawing Sheets

ENGINE SYSTEM HAVING COOLED AND HEATED INLET AIR

RELATED APPLICATIONS

This application is based on and claims the benefit of priority from U.S. Provisional Application No. 60/924,790, filed May 31, 2007, the contents of which are expressly incorporated herein by reference.

TECHNICAL FIELD

The present disclosure relates generally to an engine system and, more particularly, to an engine system having inlet air that is both heated and cooled based on operational parameters of the engine.

BACKGROUND

Engines, including diesel engines, gasoline engines, and gaseous fuel-powered engines are used to generate mechanical, hydraulic, or electrical power output. In order to accomplish this power generation, an engine typically combusts a fuel/air mixture. With the purpose to ensure optimum combustion of the fuel/air mixture and protect components of the engine from damaging extremes, the temperature of the engine and air drawn into the engine for combustion must be tightly controlled.

An internal combustion engine is generally fluidly connected to several different liquid-to-air and/or air-to air heat exchangers to cool both liquids and gases circulated throughout the engine. These heat exchangers are often located close together and/or close to the engine to conserve space on the machine. An engine driven fan is disposed either in front of the engine/exchanger package to blow air across the exchangers and the engine, or between the exchangers and engine to suck air past the exchangers and blow air past the engine, the airflow removing heat from the heat exchangers and the engine.

Although this cooling arrangement may minimize the likelihood of engine overheating and improve combustion in extreme hot conditions, it may do little to protect the engine and optimize combustion during operation in extreme cold conditions. In extreme cold conditions, engines can be difficult to start and oil that lubricates components of the engine can be so viscous that significant friction within the engine is generated and damage to the engine may occur. In addition, when the air drawn into the engine is too cold, combustion of the fuel/air mixture may be poor resulting in poor load acceptance, white smoke production, and poor fuel efficiency.

One way to improve engine operation and extend component life of the engine in cold extremes is disclosed in Japanese Patent Publication 2002-021653 (the '653 publication) by Shinichi published on Jan. 23, 2002. The '653 publication describes a diesel engine having a two-step inlet air heat exchanger with a cooling section and a heating section. The heating section is supplied with hot coolant from the engine's jacket water circuit, while the cooling section is supplied with relatively cold coolant. An inlet air temperature regulating valve is located within a coolant passageway of the cooling section, and another is located within a coolant passageway of the heating section. Both valves are controlled to regulate a flow of coolant through the cooling and heating sections in response to a temperature of the engine's inlet air and a load on the engine. That is, the flow rate of cold cooling water delivered to the cooling section is increased during times of heavy engine load and/or hot inlet air, and the flow rate of hot cooling water delivered to the heating section is increased during times of low engine load and/or cold inlet air, both flow rates being regulated to achieve a relatively constant desired temperature of the inlet air.

Although the diesel engine of the '653 publication may benefit some from tightened control of inlet air temperatures, the benefit may be limited. That is, the heating section of the '653 publication may only add heat to the inlet air when the engine's jacket water is already warm. When the engine is cold, such as when first started or when operating in extreme cold conditions, the temperature of the jacket water may be insufficient to raise the inlet air temperature to the desired value. As a result, operation at startup and continued operation in cold conditions may be less than optimal.

The disclosed engine system is directed to overcoming one or more of the problems set forth above.

SUMMARY OF THE INVENTION

In one aspect, the present disclosure is directed to a thermal management system. The thermal management system may include a first heat exchanger situated to cool air directed into the engine, a pump configured to pressurize a fluid directed through the engine, and a second heat exchanger situated to transfer heat absorbed by the fluid to air directed into the engine. The thermal management system may also include a heater configured to provide supplemental heat to air directed into the engine.

In another aspect, the present disclosure is directed to a method of cooling an engine. The method may include cooling air directed into the engine, circulating a first flow of fluid through the engine to absorb heat from the engine, and transferring heat from the first flow of fluid to air directed into the engine. The method may also include providing supplemental heat to air directed into the engine.

DETAILED DESCRIPTION

Figure 1:
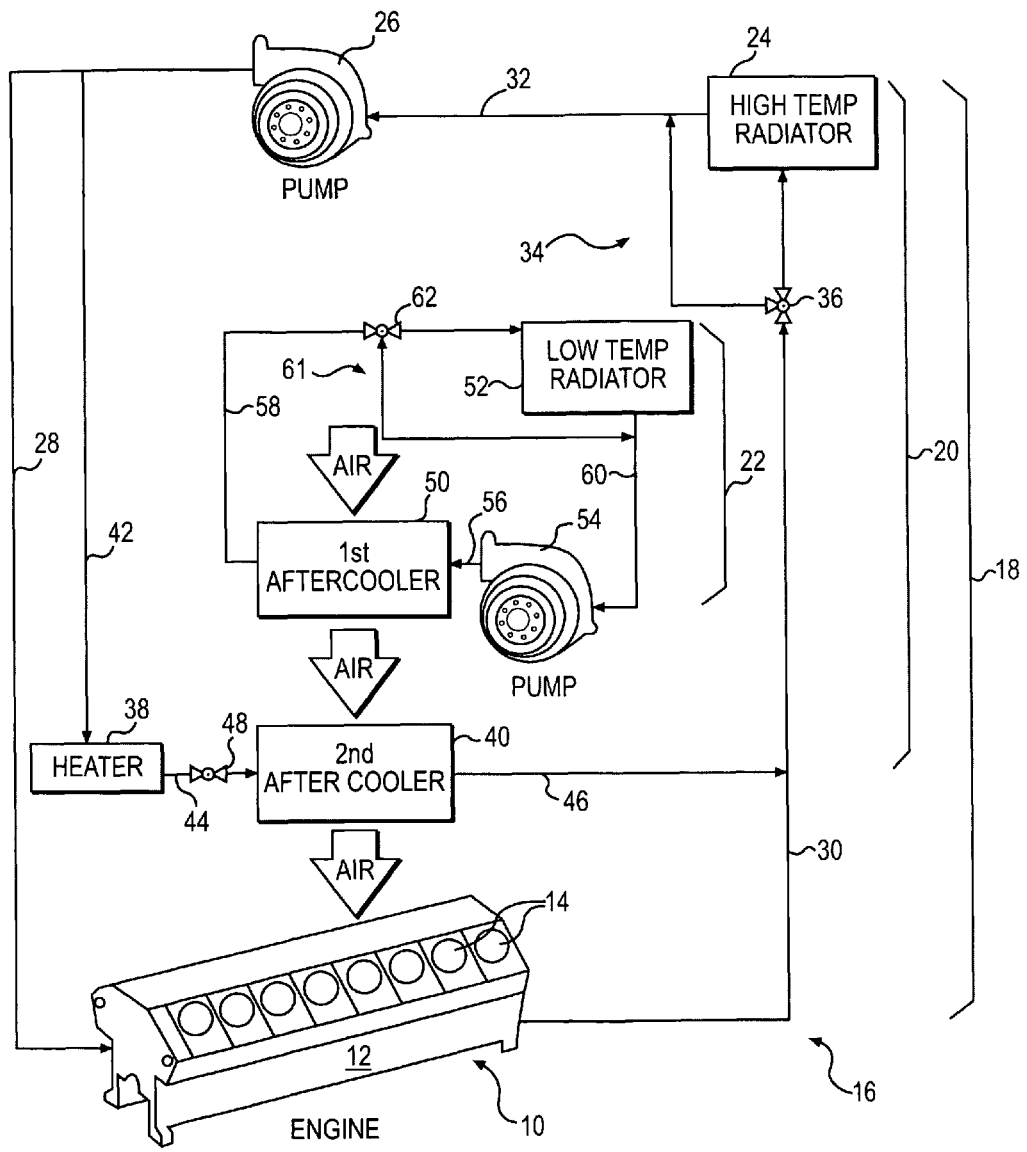
FIG. 1 is a pictorial and schematic illustration of an exemplary disclosed engine system.

FIG. 1 illustrates an exemplary disclosed engine 10 that combusts a fuel/air mixture to produce a power output. Engine 10 may include an engine block 12 that at least partially defines a plurality of cylinders 14. For the purposes of this disclosure, engine 10 is depicted and described as a four-stroke diesel engine. One skilled in the art will recognize, however, that engine 10 may be any other type of combustion engine such as, for example, a gasoline or a gaseous fuel-powered engine. In the illustrated embodiment, engine 10 includes sixteen cylinders 14 (only 8 shown). However, it is contemplated that engine 10 may include a greater or lesser number of cylinders 14 and that cylinders 14 may be disposed in an "in-line" configuration, a "V" configuration, or any other suitable configuration.

As also shown in FIG. 1, engine 10 may be associated with one or more systems that facilitate the production of power. In particular, engine 10 may include a thermal management system 16 having a first circuit 18, a second circuit 20, and a third circuit 22. Fluid flows may be regulated through any one or all of first, second, and third circuits 18-22 to regulate temperatures of engine 10. It is contemplated that engine 10 may be associated with additional systems such as, for example, a fuel system, a lubrication system, a braking system, an air conditioning system, an exhaust system, an emissions control system, a control system, and other such known systems, which may be used to facilitate the operation of engine 10.

First circuit 18 may include components that facilitate cooling of engine 10. Specifically first circuit 18 may include a heat exchanger 24 and a pump 26. Coolant such as water, glycol, a water/glycol mixture, a blended air mixture, or any other heat transferring fluid may be pressurized by pump 26 and directed through a passageway 28 to engine 10 to absorb heat therefrom. After exiting engine 10, the coolant may pass through a passageway 30 to heat exchanger 24 to release the absorbed heat, and then be drawn through a passageway 32 back to pump 26. A bypass circuit 34 having a valve 36 may selectively direct some or all of the coolant from passageway 30 around heat exchanger 24 to passageway 32 in response to one or more input.

Pump 26 may be engine driven to generate the flow of coolant described above. In particular, pump 26 may include an impeller (not shown) disposed within a volute housing having an inlet and an outlet. As the coolant enters the volute housing, blades of the impeller may be rotated by operation of engine 10 to push against the coolant, thereby pressurizing the coolant. An input torque imparted by engine 10 to pump 26 may be related to a pressure of the coolant, while a speed imparted to pump 26 may be related to a flow rate of the coolant. It is contemplated that pump 26 may alternatively embody a piston type pump, if desired, and may have a variable or constant displacement.

Heat exchanger 24 may embody the main radiator (i.e., the high temperature radiator) of engine 10 and be situated to dissipate heat from the coolant after it passes through engine 10. As the main radiator of engine 10, heat exchanger 24 may be an air-to-liquid type of exchanger. That is, a flow of air may be directed through channels of heat exchanger 24 such that heat from the coolant in adjacent channels is transferred to the air. In this manner, the coolant passing through engine 10 may be cooled to below a predetermined operating temperature of engine 10.

A cooling fan (not shown) may be associated with heat exchanger 24 to generate the flow of cooling air. In particular, the fan may include an input device (not shown) such as a belt driven pulley, a hydraulically driven motor, or an electrically powered motor that is mounted to engine 10, and fan blades (not shown) fixedly or adjustably connected thereto. The cooling fan may be powered by engine 10 to cause the fan blades to blow or draw air across heat exchanger 24. It is contemplated that the cooling fan may additionally blow or draw air across engine 10 for external cooling thereof, if desired.

Bypass circuit 34 may be used to regulate a temperature of the coolant passing through engine 10 and, thereby, the temperature of engine 10. Specifically, in response to a desired increase in coolant temperature (or at least a desire to prevent or minimize a decrease in coolant temperature), valve 36 may restrict or even block the connection from passageway 30 to heat exchanger 24 and, simultaneously, at least partially open the bypass connection between passageways 30 and 32. In this manner, the flow of coolant through heat exchanger 24 may be reduced or even completely blocked, thereby minimizing the amount of heat transfer from the coolant to the air passing through heat exchanger 24.

Second circuit 20 may include components that facilitate heating of air drawn into engine 10. Specifically second circuit 20 may include a heater 38 located upstream of a heat exchanger 40 and downstream of pump 26. Coolant from first circuit 18 may be selectively passed through a passageway 42 to heater 38 where additional or supplemental heat (i.e., heat in addition to that already absorbed from engine 10 by the coolant) may be added to the coolant. From heater 38, the coolant may be directed by way of a passageway 44 to heat exchanger 40 and from there, through a passageway 46 to passageway 30. A valve 48 may be disposed within passageway 44 to regulate the flow of coolant between heater 38 and heat exchanger 40.

Heater 38 may be configured to warm the coolant passing through second circuit 20. Heater 38 may embody any type of heater known in the art such as, for example, an electric heater, a fuel powered heater, a fluid working device, or any other heater suitable to raise the temperature of the coolant to a desired level.

Heat exchanger 40 may embody an aftercooler of engine 10 and be situated to add heat to air as it enters engine 10. Similar to heat exchanger 24, heat exchanger 40 may also be an air-to-liquid type of exchanger. That is, a flow of air may be directed through channels of heat exchanger 40 such that heat from the coolant in adjacent channels (i.e., the coolant already heated by heater 38) is transferred to the air before the air enters engine 10. In this manner, the air entering engine 10 may be heated above a predetermined operating temperature of engine 10.

Valve 48 may be a two position or proportional type valve having a valve element movable to regulate a flow of coolant through passageway 44. Specifically, the element of valve 48 may be movable from a first position, at which fluid is allowed to flow through passageway 44 substantially unrestricted by valve 48, toward a second position, at which fluid is blocked from flowing through passageway 44. The element of valve 48 may be movable to any position between the first and second positions to vary a restriction of the coolant flow and, thereby, a flow rate of the coolant. Valve 48 may be actuated in response to one or more input.

Third circuit 22 may include components that facilitate cooling of air drawn or forced into engine 10. Specifically third circuit 22 may include a first heat exchanger 50, a second heat exchanger 52, and an associated pump 54. Coolant such as water, glycol, a water/glycol mixture, a blended air mixture, or any other heat transferring fluid may be pressurized by pump 54 and directed through a passageway 56 to first heat exchanger 50 to absorb heat from the air entering engine 10. After exiting first heat exchanger 50, the coolant may pass through a passageway 58 to second heat exchanger 52 to release the absorbed heat, and then be drawn through a passageway 60 back to pump 54. A bypass circuit 61 having a valve 62 may selectively direct some or all of the coolant from passageway 58 around heat exchanger 52 to passageway 60 in response to one or more input.

Pump 54 may be engine driven to generate the flow of coolant within third circuit 22. Similar to pump 26, pump 54 may include an impeller (not shown) disposed within a volute housing having an inlet and an outlet. As the coolant enters the volute housing, blades of the impeller may be rotated by operation of engine 10 to push against the coolant, thereby pressurizing the coolant. An input torque imparted by engine 10 to pump 54 may be related to a pressure of the coolant within third circuit 22, while a speed imparted to pump 54 may be related to a flow rate of the coolant. It is contemplated that pump 54 may alternatively embody a piston type pump, if desired, and may have a variable or constant displacement.

First heat exchanger 50 may embody another aftercooler of engine 10 and be situated in series with heat exchanger 40 of first circuit 18 (either upstream or downstream) to remove heat from the air as it enters engine 10. Similar to heat exchanger 40, first heat exchanger 50 may also be an air-to-liquid type of exchanger. That is, a flow of air may be directed through channels of first heat exchanger 50 such that heat from the air is transferred to the coolant in adjacent channels (i.e., the coolant of third circuit 22 already cooled by second heat exchanger 52) before the air enters engine 10. In this manner, the air entering engine 10 may be cooled to below a predetermined operating temperature of engine 10.

Second heat exchanger 52 may embody a low temperature radiator of engine 10 and be situated to dissipate heat from the coolant of third circuit 22 after it passes through first heat exchanger 50. As the low temperature radiator of engine 10, second heat exchanger 52 may be an air-to-liquid type of exchanger. That is, a flow of air may be directed by the cooling fan described above through channels of second heat exchanger 52 such that heat from the coolant is transferred to the air in adjacent channels. In this manner, the coolant passing through first heat exchanger 50 may be cooled for subsequent heat transfer with the air entering engine 10.

Bypass circuit 61 may be used to regulate a temperature of the coolant passing through heat exchanger 50. Specifically, in response to a desired increase in coolant temperature (or at least a desire to prevent or minimize a decrease in coolant temperature), valve 62 may restrict or even block the connection from passageway 58 to heat exchanger 52 and, simultaneously, at least partially open the bypass connection between passageways 58 and 60. In this manner, the flow of coolant through heat exchanger 52 may be reduced or even completely blocked, thereby minimizing the amount of heat transfer from the coolant to the air passing through heat exchanger 52.

The inlet air passing through heat exchangers 40 and 50 may be charged. That is, engine 10 may include a charged air induction system (not shown) having at least one air compressor (not shown). The compressor may be exhaust driven by way of a turbine (i.e., the compressor and turbine, together, may form a turbocharger), or mechanically or electrically driven by engine 10 (i.e., the compressor may be one component of a supercharger). In either situation, the compressor may be located upstream of heat exchangers 40 and 50 to either compress air and force the compressed air through heat exchangers 40 and 50 into engine 10, or located downstream of heat exchangers 40 to draw the air through heat exchangers 40 and 50 and force the cooled or heated air into engine 10.

It is contemplated that only one of second and third circuits 20, 22 may be functional at a given time. That is, if it is desired to heat the air flowing into engine 10, valve 48 may be open and heater 38 actuated to heat coolant within second circuit 20 such that the air passing through heat exchanger 40 is heated to the desired temperature. In this situation, valve 62 may be closed (i.e., bypass 61 opened) so that minimal coolant, if any, is passed through first heat exchanger 50 (i.e., the air passing through first heat exchanger 50 is substantially unaffected by first heat exchanger 50). However, if it is desired to cool the air flowing into engine 10, valve 48 may be closed, heater 38 deactivated, and valve 62 opened (i.e., bypass 61 closed) so that the air passing through first heat exchanger 50 is cooled, while heat exchanger 40 has no substantial affect on the air. It is also contemplated that second and third circuits 20, 22 may cooperate to achieve an air temperature lower than possible with second circuit 20, and higher than possible with third circuit 22 (i.e., rather than hot or cold air, a warm air temperature may be achieved).

It is also contemplated that first, second, and third circuits 18, 20, 22 may cooperate to lower the inlet air temperature below that possible with only third circuit 22 alone. Specifically, if extra cooling is desired, valves 36, 48, 62 of first, second, and third circuits 18, 20, 22 may be set to flow passing, but with heater 38 deactivated. In this situation, if the coolant temperature of engine 10 is low enough and/or the efficiency of heat exchanger 24 is high enough, the coolant flows passing through second and third circuits 20, 22 may both be cool enough to affect a cooling of the inlet air (i.e., heat exchanger 24 may reduce the temperature of the coolant flow passing through second circuit 20 low enough that second circuit 20 may also affect a cooling of the inlet air).

In contrast, bypass circuit 34 may be used to increase the maximum temperature to which second circuit 20 may elevate the inlet air of engine 10. Specifically, in the event of air heating (i.e., when heater 38 is actuated and the element of valve 48 is moved to the flow passing position), the element of valve 36 may move to cause coolant to bypass heat exchanger 24. In this manner, little, if any, temperature reduction of the coolant within first and second circuits 18, 20 may be affected by heat exchanger 24.

Figure 2:
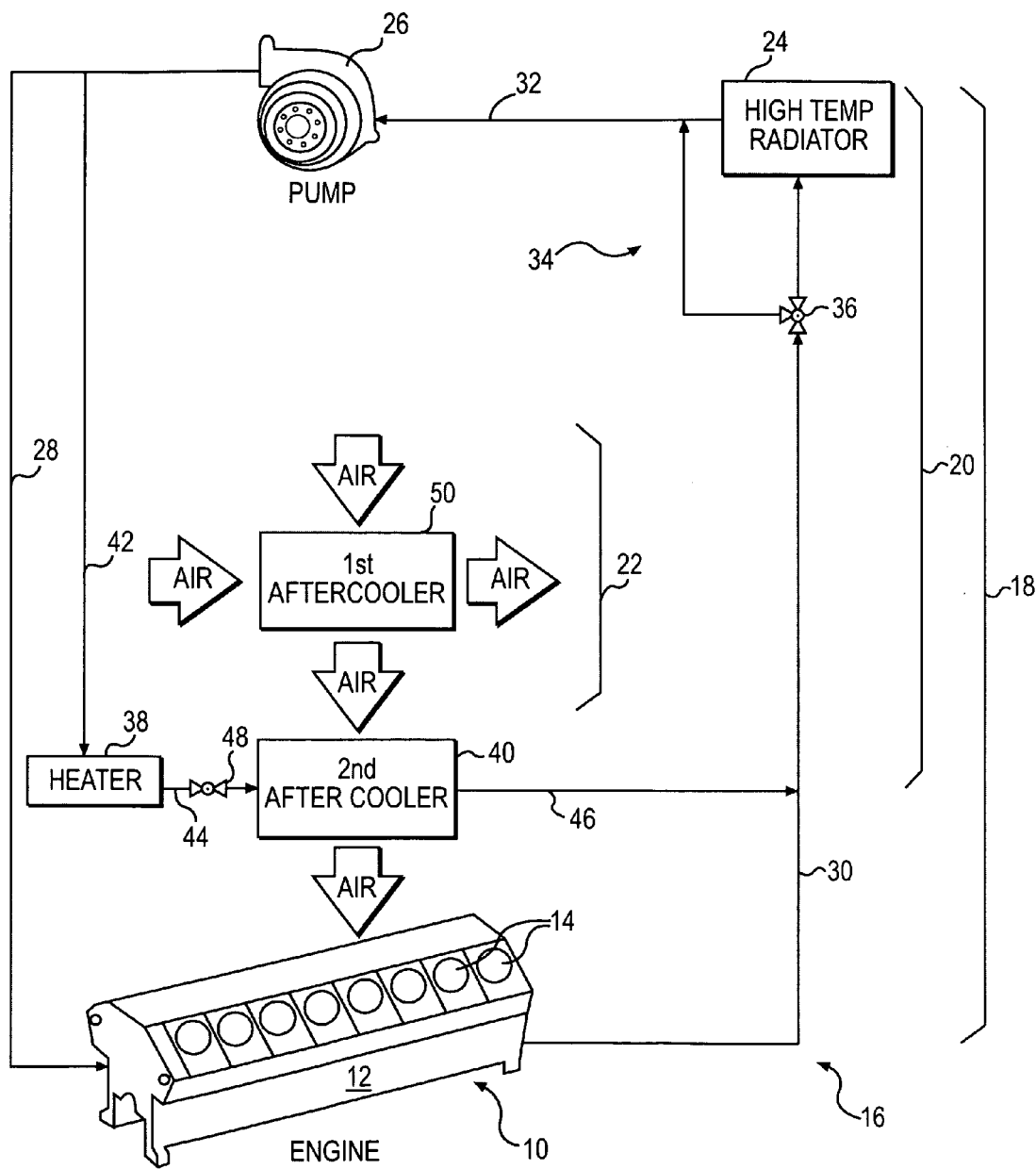
FIG. 2 is another pictorial and schematic illustration of another exemplary disclosed engine system.

FIG. 2 illustrates an alternative embodiment of engine 10. Similar to the embodiment of FIG. 1, engine 10 of FIG. 2 includes thermal management system 16 having first, second, and third circuits 18-22. However, in contrast to the embodiment of FIG. 1, third circuit 22 of FIG. 2 is adapted for air-to-air cooling. That is, heat exchanger 50, in this embodiment, may transfer heat from the air entering engine 10 directly to a cross- or counter-flow of cooling air. Although not show, it is contemplated that valve 62, in the embodiment of FIG. 2, may control the amount of cooling air, if any, that is selectively directed through heat exchanger 50 to, thereby, control the amount of heat transferred from the air entering engine 10 to the cross- or counter-flow of cooling air.

INDUSTRIAL APPLICABILITY

The disclosed cooling system may be used in any machine or power system application where it is beneficial to both heat and cool the air utilized for combustion. In particular, the disclosed cooling system may provide cooled and heated air in different situations such that optimal engine performance is realized. The disclosed system may provide this temperature flexibility by incorporating an air-heating circuit with a supplemental heater, and an air cooling circuit. The operation of thermal management system 16 will now be described.

During operation of engine 10, the various operational fluids thereof may be undesirably heated or cooled beyond acceptable operational ranges. For example, engine coolant may be circulated through and absorb heat from engine block 12, the external walls of cylinders 14, and/or cylinder heads associated with each cylinder 14 for cooling purposes. Air pressurized by the turbine- or engine-driven compressor may rise in temperature as a result of the pressurization and, when mixed with fuel and combusted, may heat up even more. If unaccounted for, these high temperatures could reduce the effectiveness or even result in failure of their respective systems. In contrast, when operating in extremely cold conditions, the coolant, oil, and/or air may be too cold for efficient or proper operation.

In order to maintain proper operating temperatures of the various engine systems, the fluids of each system may be directed through heat exchangers for heat transfer purposes. For example, the air upstream or downstream of the compressor may be directed through first heat exchanger 50 and then heat exchanger 40 before entering engine 10. The coolant from engine 10 may be directed through heat exchanger 24 (high temp radiator), while the coolant from first heat exchanger 50 may be directed through second heat exchanger 52 (low temp radiator). As these fluids flow through their respective heat exchangers, the cooling fan may be caused to rotate, thereby generating a flow of air directed through heat exchangers 24 and 52.

In hot conditions, it may be desirable to cool the air entering engine 10. In these conditions, valve 48 may be closed, heater 38 may be deactivated, and valve 62 may be opened such that first heat exchanger 50 of third circuit 22 cools the air. Alternatively or additionally, valves 36 and 48 may be opened to supply additional cooling capacity.

In cold conditions, it may be desirable to heat the air entering engine 10. In these conditions, valve 48 may be opened and valve 62 closed (i.e., moved to the bypassing position) such that the heat absorbed by the coolant passing through engine 10 may be returned to engine 10 by way of the inlet air. Additionally, the elements of valve 36 may be moved to bypass coolant around heat exchanger 24 such that little, if any, heat absorbed by the coolant is dissipated to the atmosphere by way of heat exchanger 24. Further, supplemental heat may be provided to elevate the temperature of the air even further by activating heat exchanger 40 of second circuit 20.

In moderate conditions, it may be desirable to target specific temperature ranges that result in optimal operation of engine 10. In these conditions, valves 36, 48, and 62, and/or the operation of heater 38 may be selectively manipulated to warm or cool the air such that a desired temperature within the specific temperature range is achieved.

Because the disclosed thermal management system may both heat and cool the inlet air, as necessary, operation of engine 10 may be optimized. And, because the disclosed thermal management system may include a provision for supplemental heat (i.e., heater 38), the inlet air may be heated even when the coolant passing through engine 10 is cold. This provision may facilitate cold start operations and optimal operation even in extremely cold conditions.

It will be apparent to those skilled in the art that various modifications and variations can be made to the disclosed thermal management system without departing from the scope of the disclosure. Other embodiments of the thermal management system will be apparent to those skilled in the art from consideration of the specification and practice of the thermal management system disclosed herein. It is intended that the specification and examples be considered as exemplary only, with a true scope of the disclosure being indicated by the following claims and their equivalents.

What is claimed is:

1. A thermal management system for an engine, comprising:
   a first heat exchanger situated to cool air directed into the engine;
   a pump configured to pressurize a fluid directed through the engine;
   a second heat exchanger situated to transfer heat absorbed by the fluid to air directed into the engine;
   a third heat exchanger configured to cool the fluid;
   a bypass circuit configured to direct the fluid around the third heat exchanger when the second heat exchanger is transferring heat from the fluid to air directed into the engine; and
   a heater configured to provide supplemental heat to air directed into the engine.

2. The thermal management system of claim 1, wherein the first and second heat exchangers are disposed in series relative to air directed into the engine.

3. The thermal management system of claim 1, wherein the heater is in communication with the fluid and provides supplemental heat to the air by way of the fluid and the second heat exchanger.

4. The thermal management system of claim 3, further including a valve configured to selectively interrupt fluid communication between the heater and the second heat exchanger when the first heat exchanger is cooling air directed into the engine.

5. The thermal management system of claim 1, further including a fourth heat exchanger configured to cool fluid directed through the first heat exchanger.

6. The thermal management system of claim 5, further including a valve configured to selectively interrupt fluid communication between the fourth heat exchanger and the first heat exchanger when the second heat exchanger is transferring heat from the fluid to air directed into the engine.

7. A method of cooling an engine, comprising:
   cooling air directed into the engine;
   circulating a first flow of fluid through the engine to absorb heat from the engine;
   cooling the first flow of fluid circulated through the engine;
   transferring heat from the first flow of fluid to air directed into the engine;
   restricting the first flow of fluid from being cooled when heat is being transferred from the first flow of fluid to air directed into the engine; and
   providing supplemental heat to air directed into the engine.

8. The method of claim 7, wherein air is cooled at a location upstream of a location at which air is heated.

9. The method of claim 7, wherein the supplemental heat is first provided to the first flow of fluid and then transferred from the first flow of fluid to air directed into the engine.

10. The method of claim 7, further including selectively interrupting the providing of supplemental heat when air is being cooled.

11. The method of claim 7, wherein cooling includes cooling a second flow of fluid, and transferring heat from the air to the second flow of fluid.

12. The method of claim 11, further including selectively interrupting cooling of the second flow of fluid when heat is being transferred from the first flow of fluid to air directed into the engine.

13. A thermal management system for an engine, comprising:
   a first heat exchanger situated to cool air directed into the engine;
   a pump configured to pressurize a fluid directed through the engine;
   a second heat exchanger situated to transfer heat absorbed by the fluid to air directed into the engine;
   a third heat exchanger configured to cool the fluid;
   a fourth heat exchanger configured to cool fluid directed through the first heat exchanger; and
   a heater configured to provide supplemental heat to air directed into the engine.

14. The thermal management system of claim 13, further including a valve configured to selectively interrupt fluid communication between the fourth heat exchanger and the first heat exchanger when the second heat exchanger is transferring heat from the fluid to air directed into the engine.

* * * * *